United States Patent
Gupta et al.

(10) Patent No.: US 8,457,887 B2
(45) Date of Patent: Jun. 4, 2013

(54) SYSTEM AND METHOD FOR PROVIDING TRAVEL-RELATED INFORMATION ASSOCIATED WITH A CALENDAR APPOINTMENT

(75) Inventors: Shekhar Gupta, Overland Park, KS (US); Kelsyn D. S. Rooks, Overland Park, KS (US); Jeffrey Sweeney, Olathe, KS (US); Mark Wilmoth, Gardner, KS (US); Kendra Dwyer, Wellsville, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 605 days.

(21) Appl. No.: 12/250,041

(22) Filed: Oct. 13, 2008

(65) Prior Publication Data

US 2010/0094529 A1 Apr. 15, 2010

(51) Int. Cl.
*G01C 21/00* (2006.01)

(52) U.S. Cl.
USPC ............................. 701/465; 701/423; 705/5

(58) Field of Classification Search
USPC ................... 701/117, 202, 204, 207; 705/5, 8
See application file for complete search history.

(56) References Cited

U.S. PATENT DOCUMENTS

| | | | |
|---|---|---|---|
| 6,484,033 B2 * | 11/2002 | Murray ...................... | 455/456.3 |
| 6,745,125 B2 * | 6/2004 | Saraga et al. ................. | 701/207 |
| 6,937,853 B2 * | 8/2005 | Hall .............................. | 455/416 |
| 7,649,454 B2 * | 1/2010 | Singh et al. ............... | 340/539.11 |
| 2001/0014866 A1 * | 8/2001 | Conmy et al. ..................... | 705/9 |
| 2002/0025813 A1 * | 2/2002 | Boehmer et al. .............. | 455/435 |
| 2002/0032589 A1 * | 3/2002 | Shah .................................. | 705/6 |
| 2002/0194207 A1 * | 12/2002 | Bartlett et al. ................ | 707/203 |
| 2004/0162882 A1 * | 8/2004 | Mora ............................ | 709/207 |
| 2005/0015316 A1 * | 1/2005 | Salluzzo ........................ | 705/30 |
| 2005/0227712 A1 * | 10/2005 | Estevez et al. ............. | 455/456.3 |
| 2006/0069604 A1 * | 3/2006 | Leukart et al. ..................... | 705/9 |
| 2006/0077055 A1 * | 4/2006 | Basir ........................ | 340/539.13 |
| 2007/0239832 A1 * | 10/2007 | Alperin et al. ................ | 709/206 |
| 2007/0250257 A1 * | 10/2007 | Almy ............................ | 701/200 |
| 2007/0288932 A1 * | 12/2007 | Horvitz et al. ................ | 719/313 |
| 2008/0005055 A1 * | 1/2008 | Horvitz ............................ | 706/62 |
| 2008/0086455 A1 * | 4/2008 | Meisels et al. ..................... | 707/3 |
| 2008/0167937 A1 * | 7/2008 | Coughlin et al. ................. | 705/9 |
| 2008/0167938 A1 * | 7/2008 | Meisels et al. ..................... | 705/9 |
| 2008/0195312 A1 * | 8/2008 | Aaron et al. .................... | 701/209 |
| 2009/0006994 A1 * | 1/2009 | Forstall et al. ................ | 715/764 |
| 2009/0016510 A1 * | 1/2009 | Becker et al. ............. | 379/142.15 |
| 2009/0055238 A1 * | 2/2009 | Baryshnikov et al. ............ | 705/8 |
| 2009/0064190 A1 * | 3/2009 | Pereira et al. .................. | 719/318 |
| 2009/0106036 A1 * | 4/2009 | Tamura et al. ..................... | 705/1 |
| 2009/0153353 A1 * | 6/2009 | Adams ...................... | 340/825.36 |
| 2009/0172097 A1 * | 7/2009 | O'Sullivan et al. ........... | 709/204 |
| 2009/0192702 A1 * | 7/2009 | Bourne ......................... | 701/200 |
| 2010/0042704 A1 * | 2/2010 | Chakra et al. ................. | 709/221 |

* cited by examiner

*Primary Examiner* — Helal A Algahaim
(74) *Attorney, Agent, or Firm* — Patton Boggs LLP

(57) ABSTRACT

According to one embodiment of the present invention, a method for providing travel-related information associated with a calendar appointment is presented. The method comprises monitoring a calendar application for travel-related appointments. In response to identifying a travel-related appointment, the method retrieves travel-related information associated with a location of the travel-related appointment and provides the travel-related information to a user.

20 Claims, 10 Drawing Sheets

| MENU BAR 302 |

SUBJECT: 304

LOCATION: 306

Start Date/Time: 308  310

End Date/Time: 312  314

316 → ☐ REMINDER: 318

319 → ☐ PROVIDE TRAVEL-RELATED INFORMATION

320 → ☐ FLYING?   DEPARTING AIRPORT 322   FLIGHT # 324

340

SYSTEM AND METHOD FOR PROVIDING TRAVEL-RELATED INFORMATION ASSOCIATED WITH A CALENDAR APPOINTMENT

BACKGROUND OF THE INVENTION

1. Field of the Invention

The principles of the present invention relate to computers, and more specifically, to providing travel-related information associated with a calendar appointment.

2. Description of the Related Art

With the advent of computers, many people have moved away from having physical calendars to using electronic calendars for keeping track of appointments and other important dates. Examples of electronic calendars include Microsoft® Outlook®, Google® Calendar™, and Yahoo!® Calendar™. Most electronic calendars allow a user to schedule appointments by selecting a time and date. In addition, some electronic calendars allow a user to specify a location associated with the appointment. Further, some electronic calendars provide pop-up reminders to a user of an upcoming appointment.

SUMMARY

According to one embodiment of the present invention, a method for providing travel-related information associated with a calendar appointment is presented. The method includes monitoring a calendar application for travel-related appointments. In response to identifying a travel-related appointment, the method retrieves travel-related information associated with a location of the travel-related appointment and provides the travel-related information to a user.

BRIEF DESCRIPTION OF THE DRAWINGS

For a more complete understanding of the present application, the objects and advantages thereof, reference is now made to the following descriptions taken in conjunction with the accompanying drawings, in which:

FIG. 3 is an embodiment of a graphical user interface for entering a calendar appointment;

DETAILED DESCRIPTION OF THE DRAWINGS

The disclosed embodiments provide useful travel-related information associated with travel-related appointments of a calendar application. A travel-related appointment is a calendar appointment that is identified as requiring a user to travel to a location that is different from a home and/or a work location associated with the user. As will be further described, a location of an appointment may be determined by examining a location data field associated with an appointment. In addition, in some embodiments, a location of an appointment may be determined by examining the subject matter and/or any additional data associated with the calendar appointment.

Travel-related information, as references herein, includes any information relating to a particular location that a user may find helpful in traveling to the location, such as, but not limited to, directions to the location, weather conditions at the location, and traffic conditions and/or flight information associated with traveling to the location.

Figure 1:
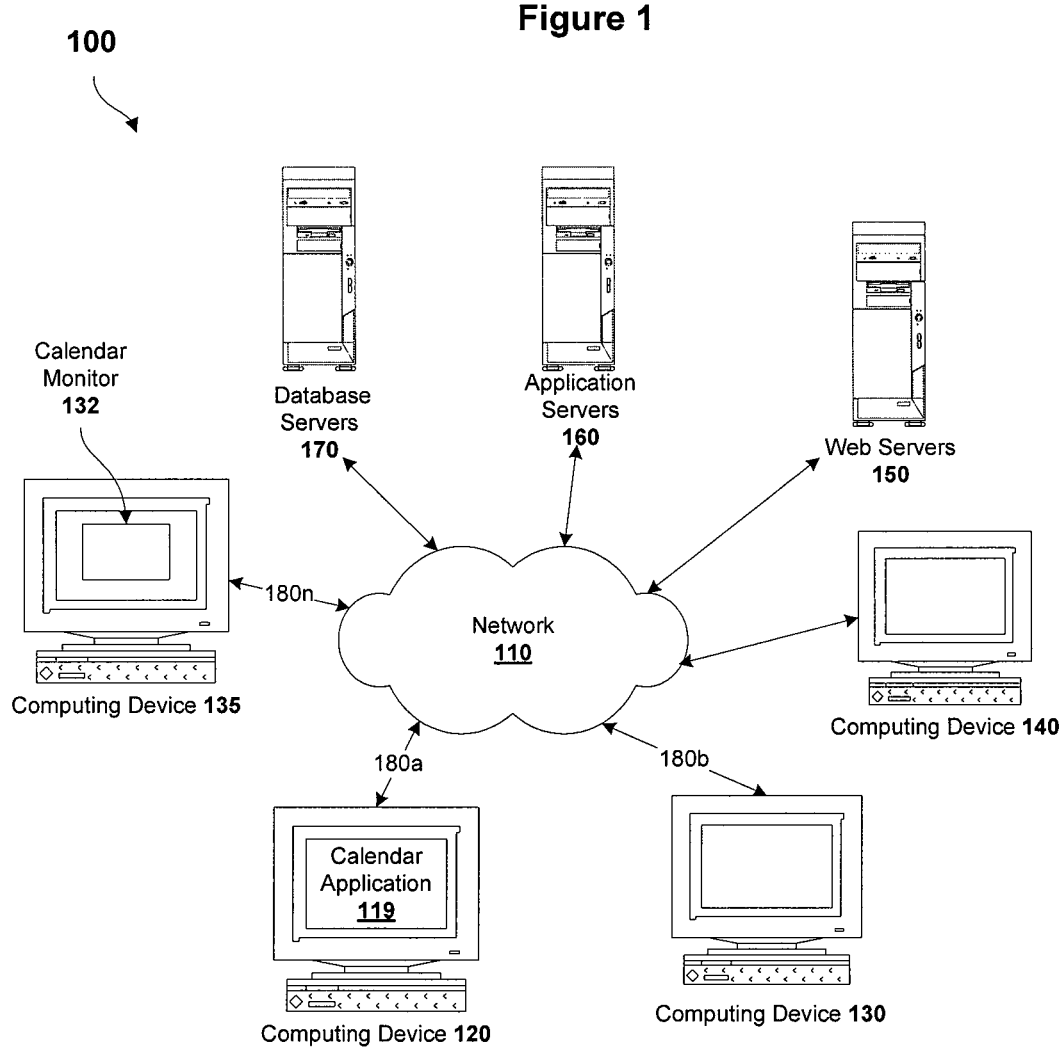
FIG. 1 depicts a network environment in which the illustrative embodiments may be implemented.
Figure 2:
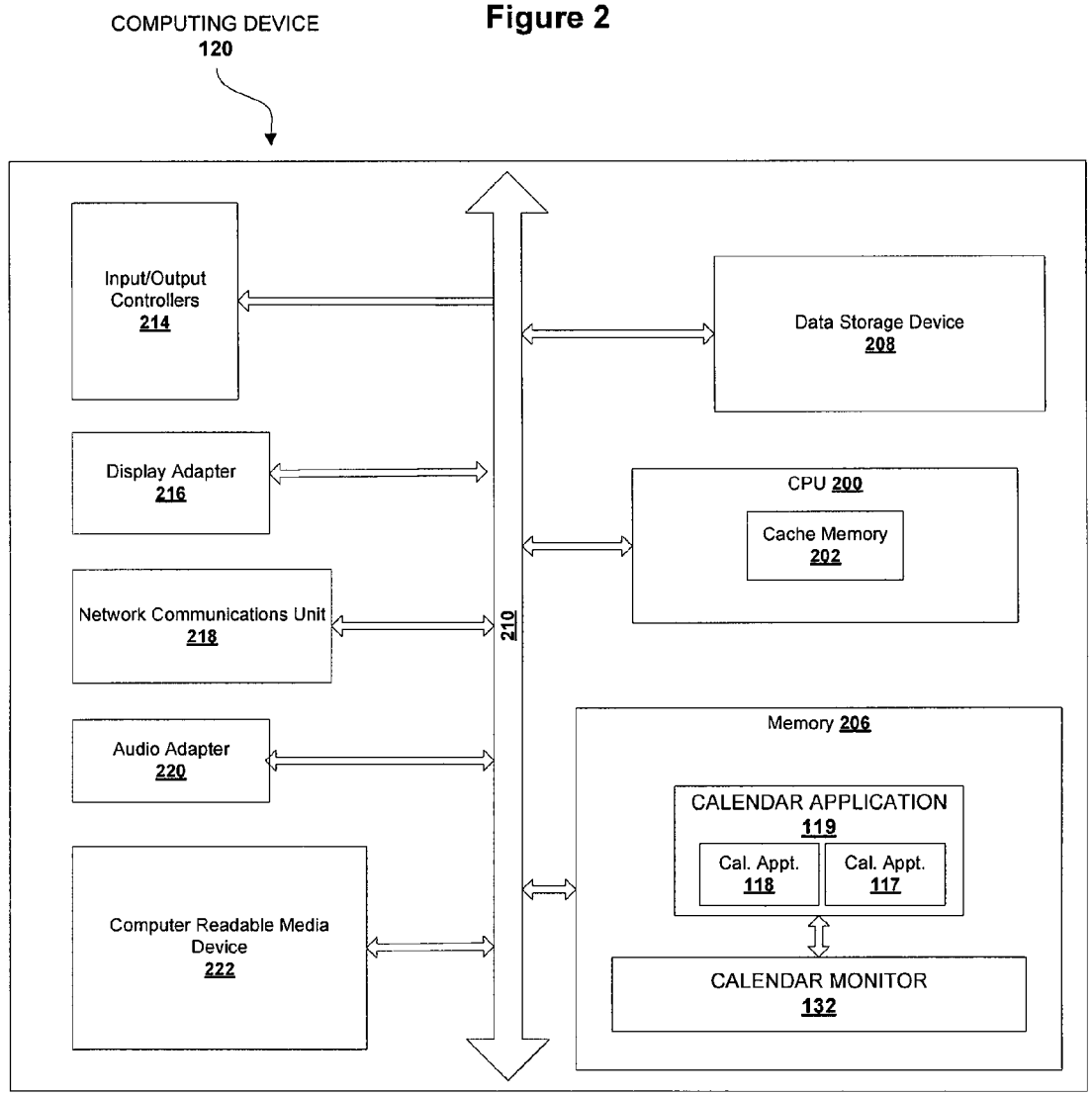
FIG. 2 is a high level component diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a network environment 100 in which the illustrative embodiments may be implemented. Network environment 100 includes network 110, which is the medium used to provide communications links between various devices and computers, such as, but not limited to, computing device 120, computing device 130, computing device 135, computing device 140, web servers 150, application servers 160, and database servers 170 connected together within network environment 100. Network 110 may include connections 180a-180n, such as wire, wireless communication links, or fiber optic cables to each of the devices.

Web servers 150, application servers 160, and database servers 170 may include one or more servers, such as, but not limited to, IBM System p® servers. In addition, computing device 120, computing device 130, computing device 135, and computing device 140 may be, for example, personal computers, network computers, personal digital assistants (PDAs), and/or smart phones. In the depicted example, web servers 150, application servers 160, and database servers 170 provide data and/or services, such as, but not limited to, data files, operating system images, and applications to computing device 120, computing device 130, computing device 135, and computing device 140. Network environment 100 may include additional servers, clients, and other devices not shown.

In some embodiments, network 110 is the Internet. The Internet is a global system of interconnected computer networks that interchange data using the standardized Internet Protocol Suite (TCP/IP). The Internet includes millions of private and public networks that are linked by copper wires, fiber-optic cables, wireless connections, and other technologies. Of course, network 110 may also be implemented as a number of different types of networks, such as, but not limited to, an intranet, a local area network (LAN), or a wide area network (WAN).

In accordance with some embodiments, a calendar monitor 132 executing on computing device 135 monitors calendar appointments of a calendar application 119 for travel-related appointments. In some embodiments, calendar monitor 132 may request and receive appointment related information from computing device 120. Alternatively, in some embodiments, computing device 120 may routinely send appointment related information to calendar monitor 132. In response to identifying a travel-related appointment, calendar monitor 132 determines a location associated with the travel-related appointment. Calendar monitor 132 retrieves travel-related information associated with the location and provides the travel-related information to a user.

As depicted in FIG. 1, in some embodiments, calendar monitor 132 may reside on a computing device remote from calendar application 119. Of course, calendar monitor 132 may also reside on a server, such as, but not limited to, application servers 160. FIG. 1 is intended as an example, and not as an architectural limitation for the different illustrative embodiments.

Figure 1A:
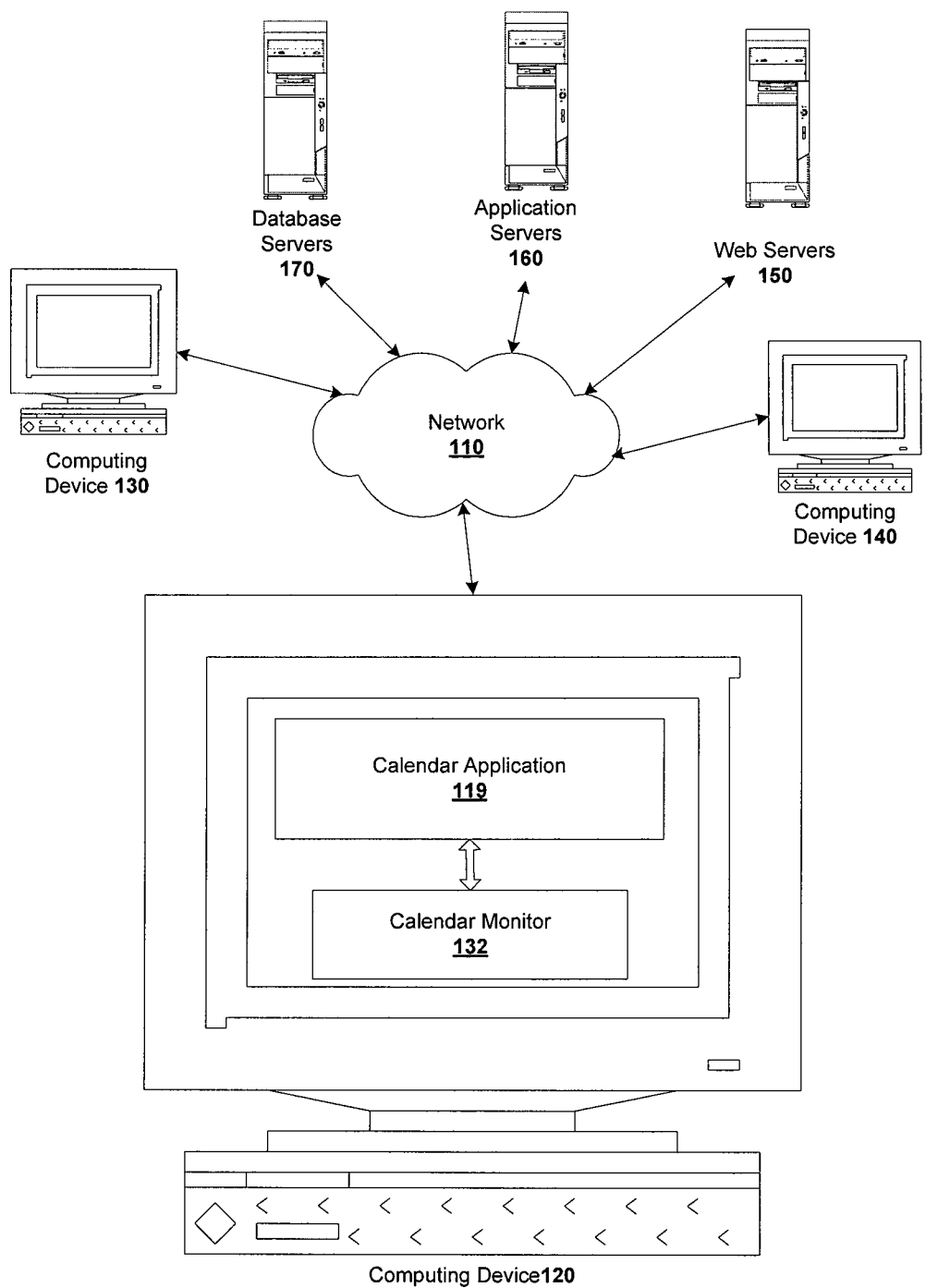
FIG. 1A depicts a local environment in which the illustrative embodiments may be implemented.

Further, in some embodiments, calendar monitor 132 may reside on the same computing device 120 as calendar application 119 as depicted in FIG. 1A. In some embodiments, calendar monitor 132 uses an application programming interface (API) to retrieve appointment related data from calendar application 119. In addition, in some embodiments, calendar monitor 132 may be incorporated as a part of calendar application 119 and/or vice versa. Further, in some embodiments, a user may be required to register with calendar monitor 132 the calendar appointments that the user desires to be monitored.

FIG. 2 is an embodiment of computing device 120 in accordance with the embodiment depicted in FIG. 1A. In this embodiment, computing device 120 includes communications bus 210, which provides communications between central processing unit (CPU) 200, memory 206, data storage device 208, input/output (I/O) controllers 214, display adapter 216, network communications unit 218, audio adapter 220, and computer readable medium reader device 222.

CPU 200 executes instructions for software that may be loaded into memory 206. CPU 200 may be a set of one or more processors or may be a multi-processor core, depending on the particular implementation. Further, CPU 200 may include one or more levels of cache memory, such as, but not limited to, cache memory 202. Cache memory 202 is used by CPU 200 to store copies of the data from the most frequently used main memory locations to reduce the average time to access memory.

Memory 206 is used to retain digital data used for processing. In some embodiments, memory 206 may be a random access memory (RAM). RAM memory allows the stored data to be accessed in any order as opposed to storage mechanisms, such as tapes and magnetic discs. In addition, memory 206 may include any other suitable volatile or non-volatile storage device.

CPU 200 loads computer executable instructions, such as, but not limited to, calendar application 119 into memory 206 for execution. Calendar application 119 may comprise one or more calendar appointments, such as, but not limited to, calendar appointment 117 and calendar appointment 118. In addition, CPU 200 may load computer executable instructions for calendar monitor 132 into memory to monitor calendar application 119 for travel-related appointments.

Data storage device 208 may take various forms depending on the particular implementation. For example, data storage device 208 may be a hard drive, flash memory, rewritable optical disk, rewritable magnetic tape, or some combination thereof The media used by data storage device 208 also may be removable, such as, but not limited to, a removable hard drive.

Input/output unit 214 may include one or more of the same and/or different types of data ports used for connecting external devices to computing device 120. Input/output unit 214 may include a serial port, a parallel port, an accelerated graphics port, and most commonly a universal serial bus (USB) port. For example, input/output unit 214 may be used to connect computer peripherals, such as mice, keyboards, PDAs, gamepads and joysticks, scanners, digital cameras, printers, personal media players, and flash drives.

Display adapter 216 is used to generate and output images to a display. Display adapter 216 may be a dedicated expansion card that is plugged into a slot on the motherboard of computing device 120 or may a graphics controller integrated into the motherboard chipset. In addition, display adapter 216 may include dedicated memory and one or more processing units.

Network communications unit 218 provides for communications with other data processing systems or devices. In these examples, network communications unit 218 is a network interface card. Modems, cable modem, Ethernet cards, and wireless interface cards are just a few of the currently available types of network interface adapters. Network communications unit 218 may provide communications through the use of physical and/or wireless communications links.

Audio adapter 220 facilitates the input and output of audio signals to and from computing device 120. For example, audio adapter 220 may provide the audio component for multimedia applications, such as music composition, editing video or audio, presentation/education, and/or entertainment, such as video games. In some embodiments, audio adapter 220 may be an expansion card added to computing device 120 to provide for audio capability.

Computer readable media device 222 provides a mechanism for reading and writing to tangible forms of computer media, such as, but not limited to, a floppy disc, a compact disc (CD), a digital versatile disc (DVD), and memory cards. For example, CPU 200 may use computer readable media device 222 to read instructions stored on a computer media for executing the computer executable instructions of calendar monitor 132.

The different components illustrated for computing device 120 are not meant to provide architectural limitations to the manner in which different embodiments may be implemented. For example, the different illustrative embodiments may be implemented in a data processing system including components in addition to or in place of those illustrated for computing device 120.

FIG. 3 is an embodiment of a graphical user interface 300 for entering a calendar appointment, such as, but not limited to, calendar appointment 118. In the depicted example, graphical user interface 300 includes a menu bar 302. Menu bar 302 may include one or features associated with creating a new calendar appointment. For example, menu bar 302 may include features for spellchecking, formatting, and/or saving a new calendar appointment.

In addition, graphical user interface 300 comprises a subject data entry field 304 and a location data entry field 306. Subject data entry field 304 may be used to specify a subject/event associated with the calendar appointment. In addition, location data entry field 306 may be used to specify a location associated with calendar appointment. In some embodiments, subject data entry field 304 and/or location data entry field 306 may be left empty.

Graphical user interface 300 also includes a start date data entry field 308 and a start time data entry field 310 for selecting a start date and time. In some embodiments, a start date data entry field 308 and a start time data entry field 310 may be a pull down menu of dates and times to allow a user to select a desired date and start time. Similarly, in some embodiments, graphical user interface 300 includes an end date data entry field 312 and an end time data entry field 314.

Additionally, in some embodiments, graphical user interface 300 may allow a user to select a reminder option 316 for presenting the user with reminders of the created calendar appointment. For example, a user may specify in reminder data entry field 318 that a reminder be sent to the user 15 minutes prior to the specified start date and time.

In some embodiments, graphical user interface 300 may include a provide travel-related information option 319 to enable a user to specify a calendar appointment as a travel-related appointment. Further, in some embodiments, responsive to a user selecting provide travel-related information option 319, graphical user interface 300 may enable a flight option 320. In response to selecting flight option 320, a user may select a departing airport in departing airport data field 322 and may enter in a flight number in flight number data field 324. The flight information may be used by calendar monitor 132 in providing travel-related information. For example, in some embodiments, a calendar monitor 132 may monitor the flight schedule associated with the entered flight information to provide the user with real-time flight status information as part of the provided travel-related information. Of course, in some embodiments, additional flight information may be collected, such as, but not limited to, return flight information.

Additionally, in some embodiments, additional notes/text may be included in with the calendar appointment in data entry field 340. For example, a user may enter a reminder note, such as, "Bring blue notebooks to meeting."

Figure 4:
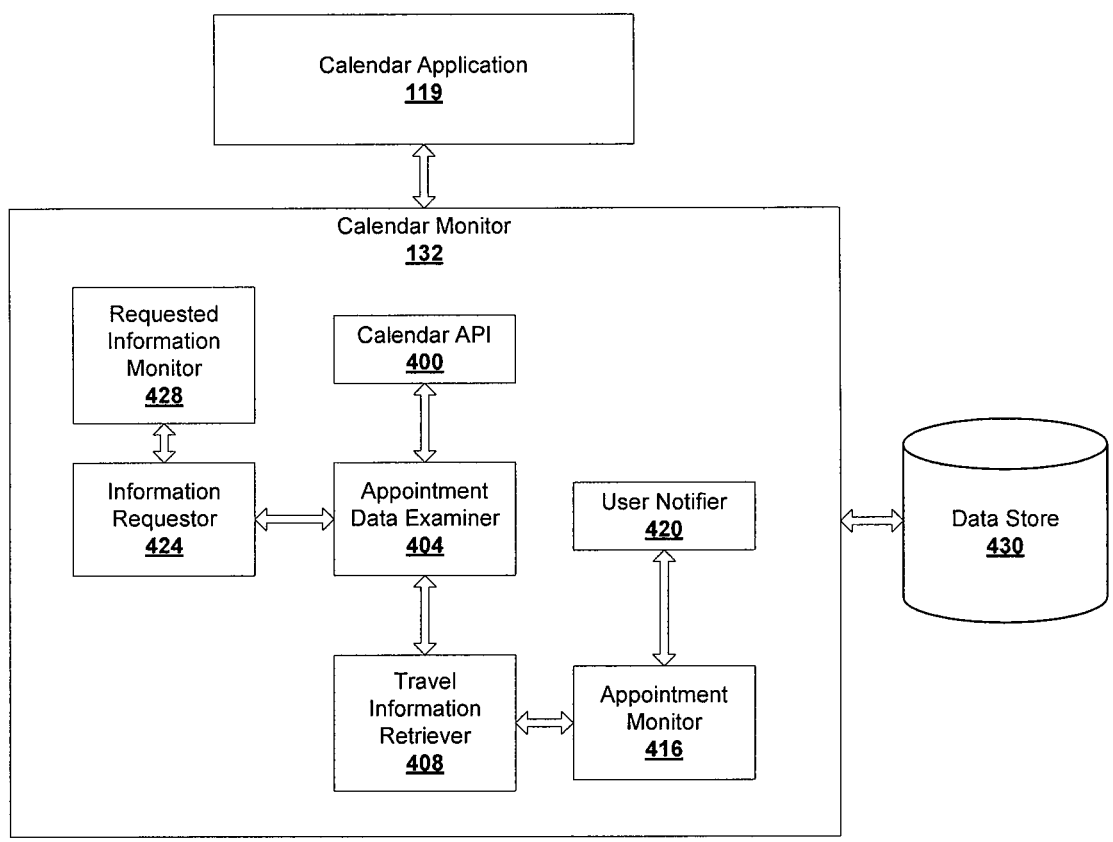
FIG. 4 is an embodiment of a calendar monitor for providing travel-related information associated with a calendar appointment.

FIG. 4 is an embodiment of calendar monitor 132 for providing travel-related information associated travel-related appointments of calendar application 119. Calendar monitor 132 includes, among other modules, a calendar application programming interface (API) 400, appointment data examiner 404, travel-related information retriever 408, appointment monitor 416, and user notifier 420.

Calendar API 400 is a set of functions, procedures or classes used for accessing and retrieving appointment related data from calendar application 119. In some embodiments, calendar API 400 may be implemented as part of calendar application 119. For example, Google® Calendar™ Data API may be used to create new calendar appointments, edit or delete existing calendar appointments, and query for calendar appointments that match particular criteria.

Appointment data examiner 404 examines data retrieved from calendar application 119 to identify travel-related appointments. In some embodiments, a travel-related appointment is identified from a user-specified location in location data entry field 306. For example, if a user specifies a location in location data entry field 306 that is different from a home and/or a work address associated with the user, then appointment data examiner 404 identifies the calendar appointment as a travel-related appointment. Alternatively, in some embodiments, a location of an appointment may be determined by examining the subject matter and/or any additional data associated with the calendar appointment, such as, but not limited to, data from data entry field 340. For example, a user may enter "lunch with Bob at Olive Garden" in data entry field 340 without specifying a location in location data entry field 306. In this case, appointment data examiner 404 may parse the data of data entry field 340 to identify key terms, such as, but not limited to, "lunch" and/or "Olive Garden" as being associated with a travel-related appointment. Of course, in some embodiments, a user may simply select an option, e.g., provide travel-related information option 319, specifying a particular calendar appointment as a travel-related appointment. Once a travel-related appointment is identified, appointment data examiner 404 determines a location associated with the travel-related appointment and passes that information on to travel-related information retriever 408.

Travel-related information retriever 408 retrieves travel-related information associated with the location of the travel-related appointment. For example, in some embodiments, travel-related information retriever 408 may retrieve a map/directions from a user location to the location of the travel-related appointment. The user location, as will be further described below, may be determined in several ways including, but not limited, setting the user location to a work location for workday appointments, a home location for weekend appointments, a location of a prior calendar appointment, an actual current location of a user and/or to a user-specified location for a particular calendar appointment. For example, if a user knows that he will be out of town for a particular meeting, the user may specify a hotel address as the user location.

In addition, in some embodiments, travel-related information retriever 408 may determine or identify flight information from a travel-related appointment. In these embodiments, travel-related information retriever 408 retrieves the specified airport and flight information. Travel-related information retriever 408 then retrieves a map/directions from a user location to the specified airport.

Further, in some embodiments, travel-related information retriever 408 may retrieve other travel-related information, such as, but not limited to, weather information, points of interests and traffic conditions associated with the calendar appointment location. The retrieved travel-related information is automatically provided to the user.

Moreover, in some embodiments, travel-related information retriever 408 determines an estimated time of travel from a user location to a calendar appointment location and/or airport associated with the calendar appointment. Based off of the estimated time of travel, the disclosed embodiments provide smart reminders to a user of a calendar appointment. For example, currently, a user may be reminded of calendar appointment at a specified time prior to the appointment, e.g., 15 minutes prior to the appointment time. However, a 15 minute reminder is of little help if the user forgets about the calendar appointment and the estimated time to travel to the calendar appointment location takes 30 minutes. Thus, a user may already be late to a calendar appointment before receiving a calendar appointment reminder notification. Accordingly, in some embodiments, calendar monitor 132 provides smart reminders to a user of a calendar appointment by taking into account an estimated travel time. Further, in some embodiments, the estimated travel time may account for current traffic conditions.

In some embodiments, appointment monitor 416 monitors the retrieved information associated with the travel-related appointment for any changes. For example, appointment monitor 416 may routinely retrieve the flight information associated with a calendar appointment and notify a user of any changes to the flight schedule. Other information including, but not limited to, traffic and/or weather conditions may also be monitored.

User notifier 420 provides the user with the retrieved travel-related information. In some embodiments, the user may specify a time period to be notified of the travel-related information. For example, the user may specify that any travel-related information for the entire week be provided at the beginning of the week. Further, in some embodiments, the user may specify a time period for notifying the user of any changes to the travel-related information. For example, the user may specify that updated travel-related information be provided as part of an appointment reminder and/or that any changes to the travel-related information be immediately notified to the user.

In addition, in some embodiments, calendar monitor 132 may include an information requestor 424. Information requester 424 may transmit a request to a user requesting additional information about a calendar appointment. For example, in some embodiments, information requestor 424 may request a user to enter location information for a calendar appointment having an empty location data entry field 306. In addition, in some embodiments, information requestor 424 may request a user to clarify location information. For example, if a user specifies "Olive Garden" in location data entry field 306 and more than one Olive Garden exist within the surrounding area, then information requestor 424 may request the user to provide additional information, such as, but not limited to, the city and/or zip code of the location associated with the calendar appointment.

In some embodiments, information requestor 424 passes the calendar appointment data that is requested to a requested information monitor 428. Requested information monitor 428 monitors for receipt of the requested information. Once requested information monitor 428 receives the requested information, requested information monitor 428 notifies calendar monitor 132 to enable calendar monitor 132 to process the specified calendar appointment.

In addition, in some embodiments, calendar monitor 132 stores and retrieves data from a data store, such as, but not limited to, data store 430. Data store 430 may include one or more local or remote databases. For example, in some embodiments, data store 430 may include personal data associated with the user, such as, but not limited to, the user name, home address, work address, email address, and other user-specified preferences.

Figure 5:
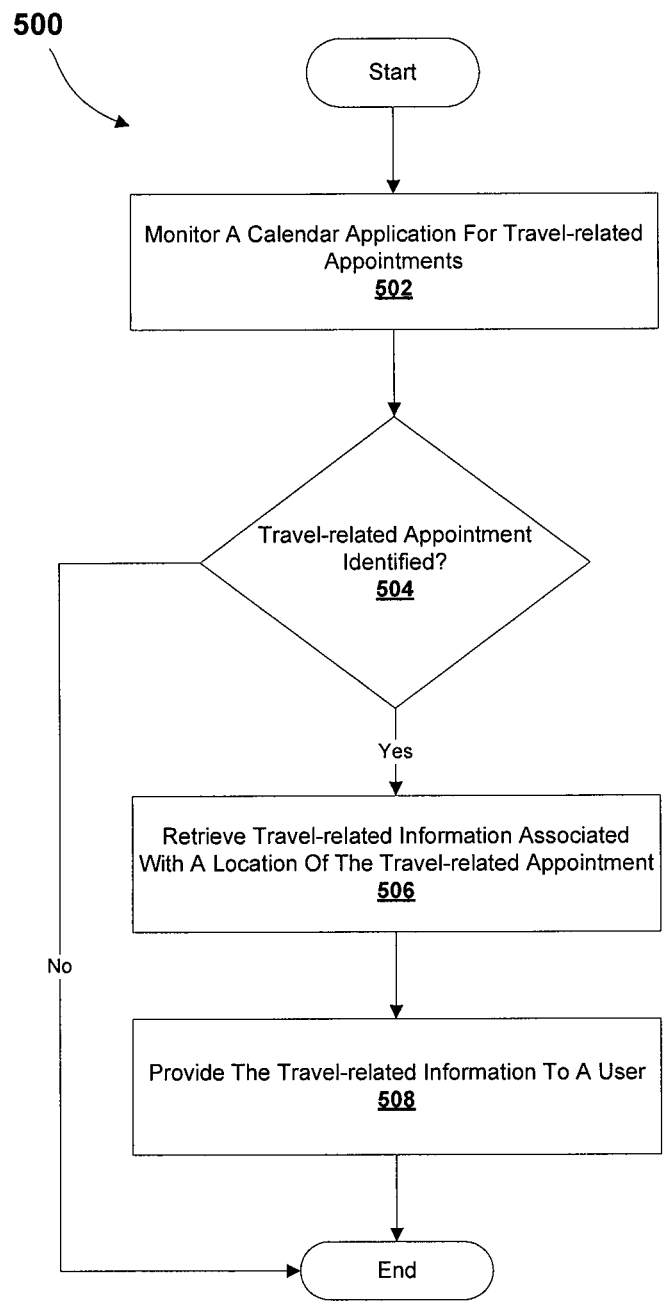
FIG. 5 is an embodiment of a process for providing travel-related information associated with calendar appointments.

With reference now to FIG. 5, an embodiment of a process 500 for providing travel-related information associated with calendar appointments is presented. Process 500 begins by monitoring a calendar application for travel-related appointments at step 502. At step 504, the process determines if a travel-related appointment is identified. In response to identifying a travel-related appointment, the process, at step 506, retrieves travel-related information associated with a location of the travel-related appointment. At step 508, the process provides the travel-related information to a user, with the process terminating thereafter.

Figure 6:
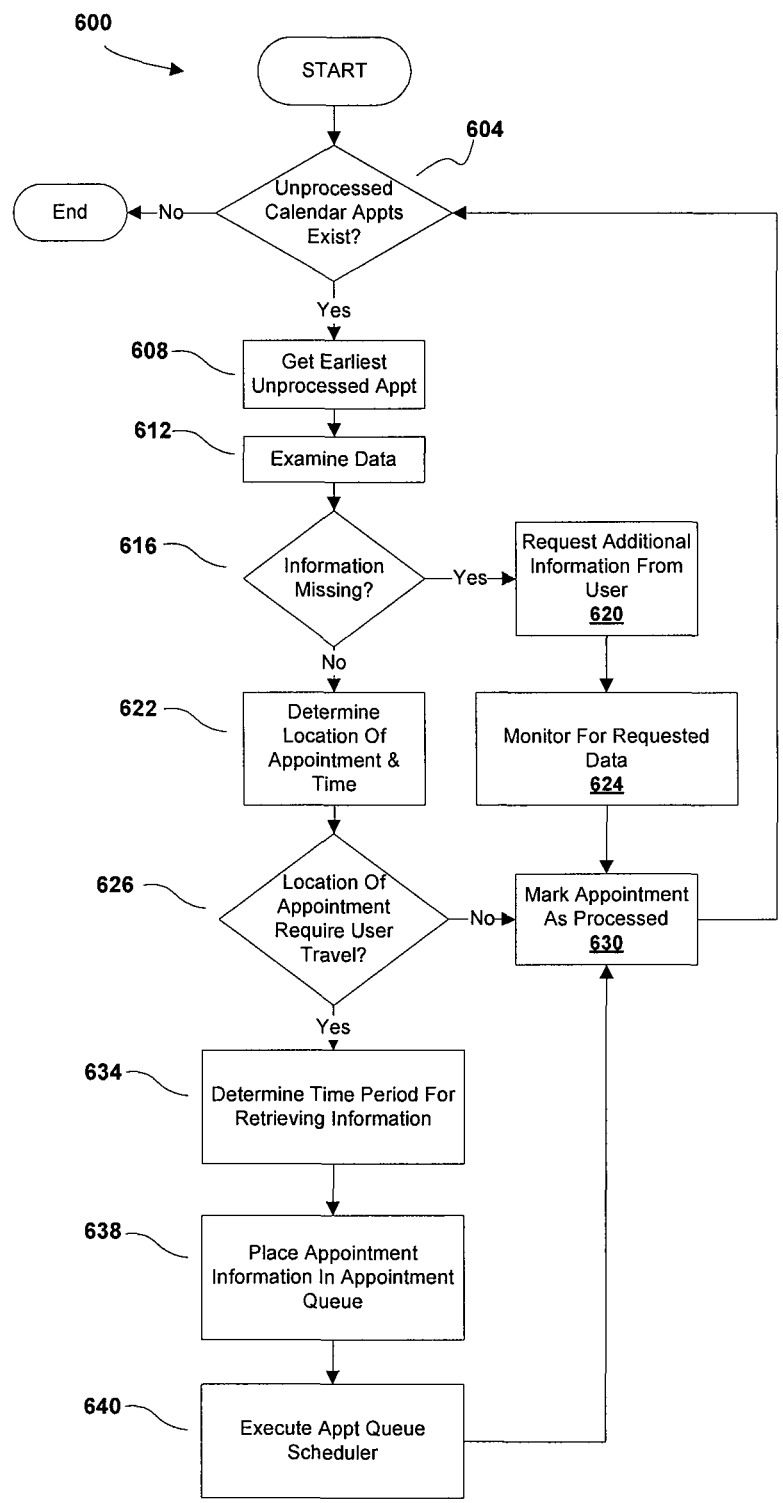
FIG. 6 is an embodiment of a process for identifying travel-related calendar appointments.

FIG. 6 is an embodiment of a process 600 for identifying travel-related calendar appointments. In some embodiments, process 600 may be performed continuously. Alternatively, in some embodiments, process 600 may be performed periodically at specified intervals. Process 600 begins by determining, at step 604, whether an unprocessed calendar appointment exists. An unprocessed calendar appointment is a calendar appointment that has not been reviewed/examined to determine whether the calendar appointment is a travel-related appointment. If all calendar appointments have been processed then process 600 terminates.

However, if an unprocessed calendar appointment exists, the process retrieves the data associated with the earliest unprocessed calendar appointment at step 608. For example, if an unprocessed calendar appointment is scheduled for tomorrow and another calendar appointment is scheduled for next week, process 600 retrieves the data associated with the unprocessed calendar appointment that is scheduled for tomorrow. Of course, in some embodiments, process 600 may retrieve and process the data associated with two or more unprocessed calendar appointments in parallel.

At step 612, the process examines the retrieved data of the unprocessed calendar appointment to determine if the calendar appointment is travel-related. For example, in some embodiments, a user may specify a calendar appointment as travel related, e.g., by selecting provide travel-related information option 319 as depicted in FIG. 3. Alternatively, in some embodiments, process 600 may examine the subject matter, location data field, and/or any additional data associated with the calendar appointment to determine whether the calendar appointment is travel related.

Based on examining the data at step 612, the process, at step 616, determines whether any information is missing and/or is needed to properly identify the calendar appointment as a travel-related appointment. For example, a user may simply enter "dinner with Mary" in subject data entry field 304 without specifying a particular location. Thus, without further information, process 600 cannot provide any travel-related information. Therefore, in some embodiments, process 600 may send a request for additional information to the user at step 620. The user request may be in the form of, but is not limited to, an email requesting the additional information from the user. Process 600, as will be further described in FIG. 7, monitors for the requested data at step 624. At step 630, process 600 marks the appointment as processed or with some other type of indicator to indicate that the calendar appointment is awaiting additional information to ensure that the same calendar appointment is not processed repeatedly.

If additional information is not needed at step 616, the process determines a start time and a location associated with the calendar appointment at step 622. At step 626, the process compares the location of the calendar appointment to a work and/or home location of the user to determine if the calendar appointment requires the user to travel. If the calendar appointment does not require the user to travel, the process marks the calendar appointment as processed at step 630 and returns to step 604.

However, if the calendar appointment does require the user to travel, then, in some embodiments, the process determines the appropriate time period for retrieving the travel-related information based on a user-specified preference at step 634. For example, a user may prefer to be notified of the travel-related information only 48 hours in advance of the calendar appointment. Thus, if the calendar appointment is not for another three weeks, the process, at step 638, places the appointment information into an appointment queue for retrieving the travel-related information at the preferred time. At step 640, the process executes an appointment queue scheduler to monitor and retrieve the travel-related information at the appropriate time. An embodiment of a process performed by the appointment queue scheduler is further described in FIG. 8.

Figure 7:
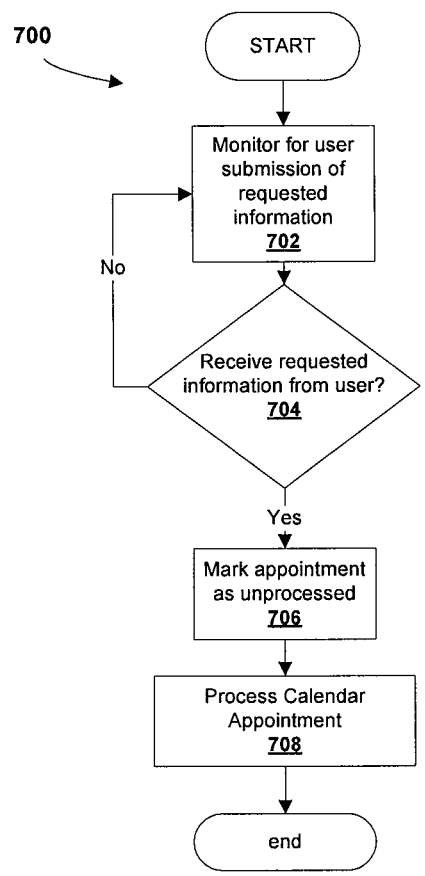
FIG. 7 is an embodiment of a process for monitoring for requested user data associated with a calendar appointment.

FIG. 7 is an embodiment of a process 700 for monitoring for requested user data associated with a calendar appointment. At step 702, the process monitors for a user response to the request for additional information associated with a calendar appointment. At step 704, the process determines if the process has received the requested information. If the process receives the requested information from the user, the process, at step 706, marks the calendar appointment as unprocessed and/or with some other indicator to enable the calendar appointment to be process. At step 708, the process processes the calendar appointment associated with the received information (as depicted in FIG. 6), with process 700 terminating thereafter.

In some embodiments, if process 700 has not received the requested information from the user after a specified period of time, the process may resubmit the request for additional information to the user. Further, in some embodiments, a user may specify that if a response to a request for additional information is not received within a specified period of time, then the process should treat the associated calendar appointment as a non-travel-related appointment.

Figure 8:
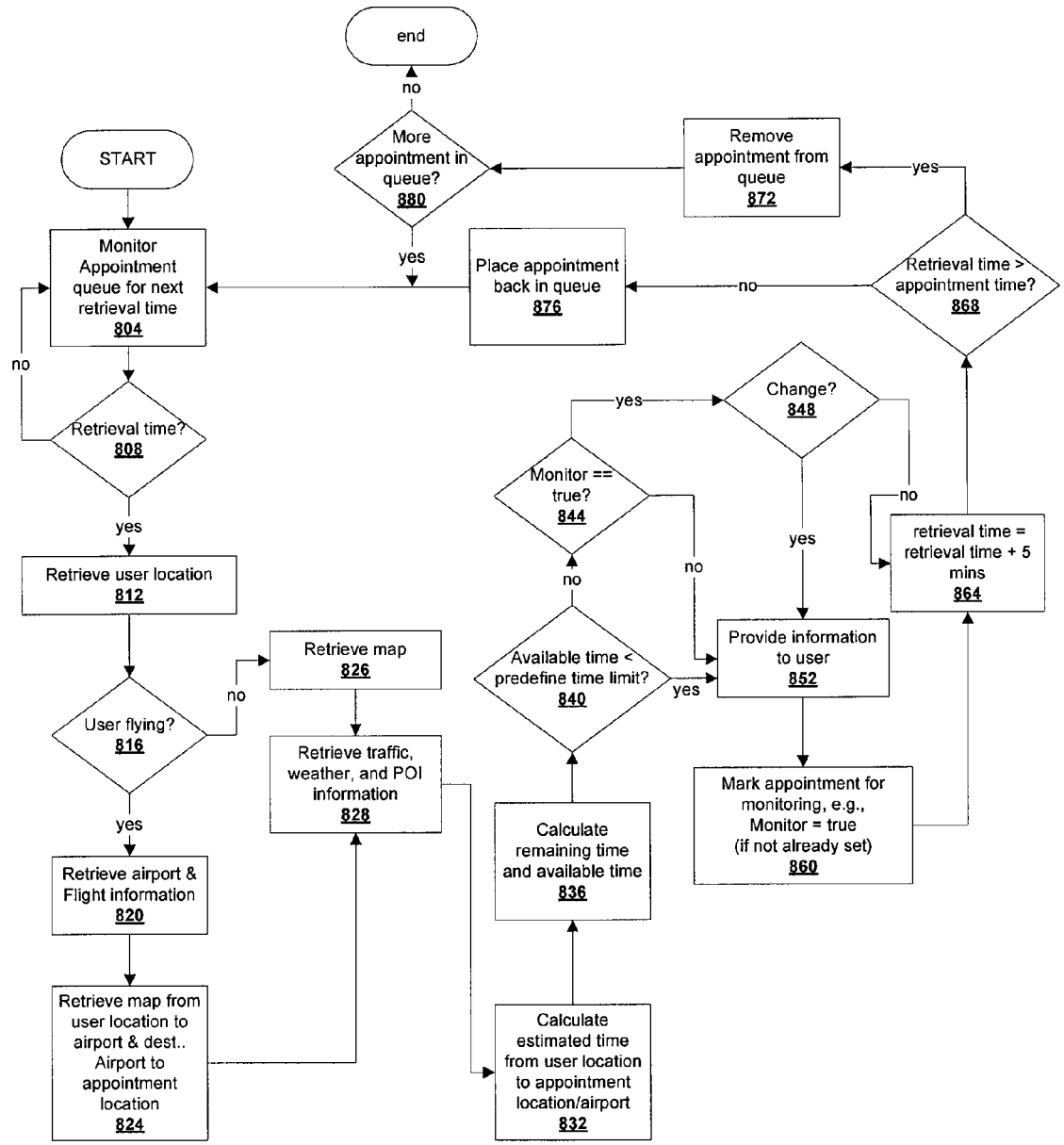
FIG. 8 is an embodiment of a process for providing travel-related information to a user.

With reference now to FIG. 8, an embodiment of a process 800 for providing travel-related information is presented. In addition, process 800 notifies a user of changes to the travel-related information and also provides smart reminder notifications to a user. Further, process 800 monitors and retrieves the travel-related information at a user-specified time.

Process 800 begins, at step 804, by monitoring the appointment queue for the next travel-related information retrieval time associated with a calendar appointment. In some embodiments, the appointment queue is ordered based on retrieval time. At step 808, the process determines whether the next retrieval time of a calendar appointment matches a current time. If the process determines that the retrieval time of the next calendar appointment matches the current time, the process retrieves a user location at step 812. An embodiment of a process for retrieving a user location will be further described in FIG. 9.

The process determines, at step 816, whether flight information is associated with a calendar appointment. For example, a user may enter in flight information associated with calendar appointment as depicted in FIG. 3. Alternatively, in some embodiments, if the location of the calendar appointment is outside a specified travel range, such as, but not limited to, 200 miles from a work or home location, the process may send a request to the user for any flight information associated with the calendar appointment. If flight information is associated with the calendar appointment at step 816, the process retrieves the flight information at step 820. At step 824, the process retrieves a map and/or directions from the user location to an airport location associated with the retrieved flight information. In some embodiments, the process may also retrieve a map and/or directions from the arriving airport to a specified location, such as, but not limited to, the calendar appointment location and/or a hotel location. However, if, at step 816, the process determines that flight information is not associated with the calendar appointment, the process retrieves a map and/or directions from a user location to the calendar appointment location at step 826. In some embodiments, the process, at step 828, retrieves additional travel-related information, such as, but not limited to, traffic conditions, weather conditions, and/or points of interest, such as, but not limited to, landmarks associated with the location of the travel-related appointment.

Further, in some embodiments, the process provides smart reminders to a user of a calendar appointment by calculating the estimated time from a user location to a calendar appointment location/airport at step 832. At step 836, the process calculates a remaining time and an available time. The remaining time is the difference between the calendar appointment time and the current time. The available time is the difference between the remaining time and the estimated travel time. For example, if the current time is 11 a.m. and the calendar appointment time is 12 noon, then the remaining time is one hour. If the estimated travel time from the user location to the calendar appointment location is 45 minutes, then the available time is 15 minutes. At step 840, the process determines if the available time is less than or equal to a specified time limit. If the available time is less than or equal to the specified time limit, the process notifies the user at step 852. In some embodiments, the user may turn off the smart reminders by acknowledging the notification. If the user does not acknowledge the smart reminder, the process may send another smart reminder after a specified number of minutes. For instance, in the above example, a user may specify the time limit to 15 minutes because the user desires to be early to a calendar appointment or requires a few minutes to pack up and go. In such a case, the user will be notified/reminded at 11 a.m. to leave for the 12 noon calendar appointment.

At step 844, the process determines if the travel-related information is being monitored only for changes associated with a previously provided set of travel-related information. In other words, if the travel-related information was previously provided to the user, the process only provides updated travel-related information to the user in response to a change in condition, such as, but not limited to, changes to traffic/weather conditions and/or flight status. If the travel-related information was not previously provided to the user, the process provides the travel-related information to the user at step 852. The process then marks the calendar appointment for monitoring at step 860, i.e., monitor for changes to the travel-related information associated with this calendar appointment. At step 864, the process then increments the retrieval time by a set number of minutes, such as, but not limited to, five minutes. Thus, in this example, the process monitors for changes to the travel-related information every five minutes.

However, if the travel-related information was previously provided to the user, the process determines, at step 848, whether any changes to the previously provided travel-related information have occurred. If a change to the travel-related information has occurred, the user is notified of the change to the travel-related information step 852. If the previously provided travel-related information has not changed, the process increments the retrieval time by a set number of minutes at step 864.

At step 868, the process determines if the incremented retrieval time is greater than a start time associated with the retrieved calendar appointment time. If so, the process removes the calendar appointment from the appointment queue at step 872. At step 880, the process determines if more appointments exist in the appointment queue. If the appointment queue is empty, the process terminates. However, if the appointment queue is not empty, the process returns to step 804 and monitors the appointment queue for the next retrieval time.

However, if, at step 868, the incremented retrieval time is not greater than the calendar appointment time, the process places the calendar appointment back in the appointment queue at step 876. The process then returns to step 804 and repeats process 800 until the appointment queue is empty.

Figure 9:
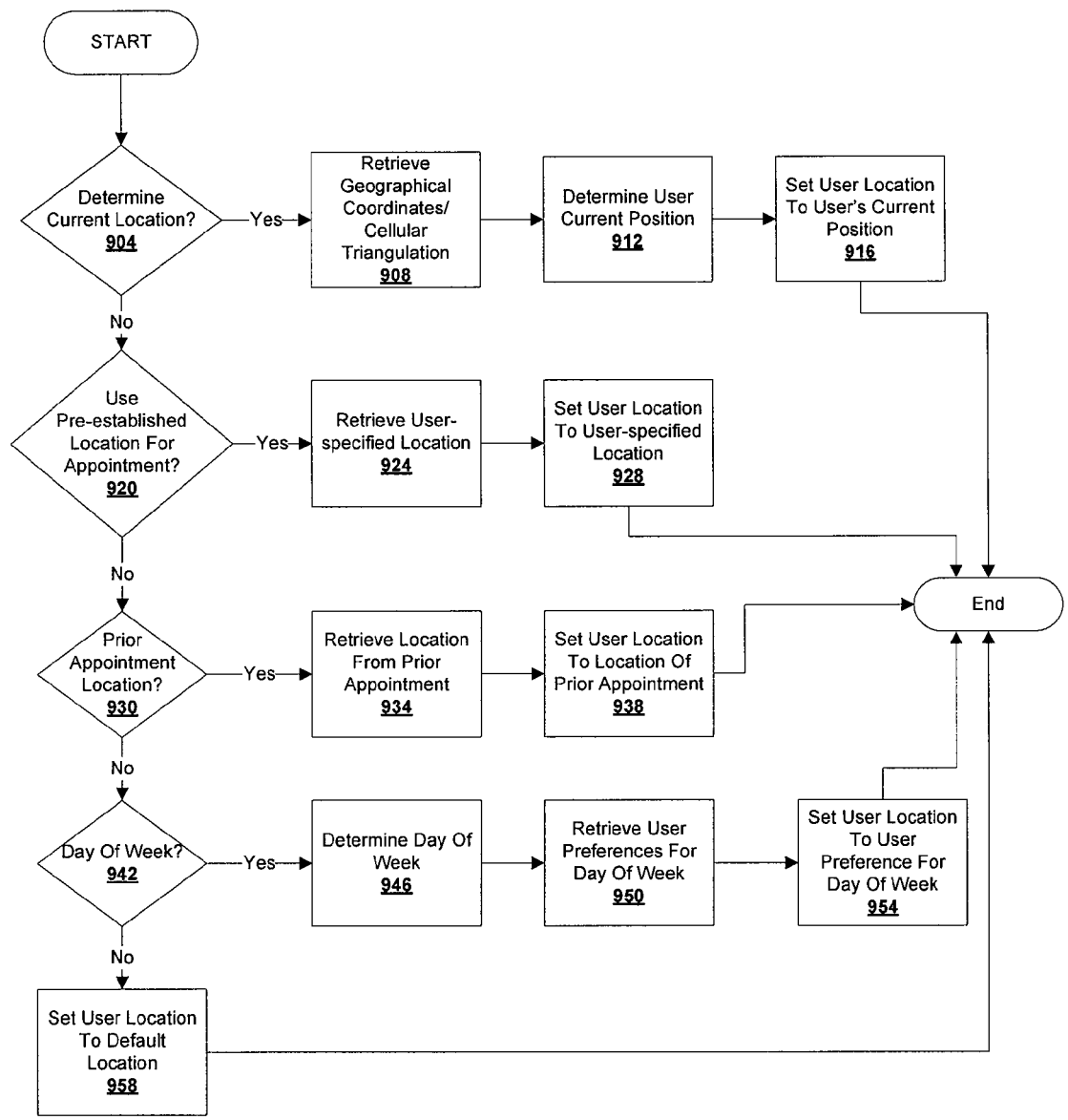
FIG. 9 is an embodiment of a process for determining a user location in accordance with the illustrative embodiments.

FIG. 9 is an embodiment of a process for determining a user location in accordance with the illustrative embodiments. Process 900 provides several options for determining a user location. The method for determining a user location may be specified by a user for a particular calendar appointment and/or for all calendar appointments.

For example, at step 904, the user may specify that a current user location be determined, i.e., a real-time approximate location. In these embodiments, the process, at step 908, retrieves geographical coordinates, such as, but not limited to, GPS coordinates and/or cellular triangulation points associated with an electronic device that is carried and/or is known to be in the proximity of the user. For example, in some embodiments, the user may be located by determining the location of a cellular device associated with the user. Alternatively, in some embodiments, the user may be located by determining the location of a vehicle associated with the user. Of course, other methods now known or later developed may be used to determine a current user location. At step 912, the process determines the current position of the user using the received coordinates. The process sets the user location to the current position of the user at step 916, with the process terminating thereafter.

In some embodiments, a user, at step 920, may specify a pre-established user location for a particular calendar appointment and/or all calendar appointments. If a pre-established user location is specified, the process retrieves the pre-established user location at step 924. The process then sets the user location to the user specified location at step 928, with the process terminating thereafter.

Alternatively, in some embodiments, a user, at step 930, may specify that the process determines a user location based on a prior calendar appointment location. For example, a user may specify that if a prior appointment is within a specified time limit of the next appointment, then the user location should be the location of the prior appointment. If the next appointment is within the specified time limit, then, at step 934, the process retrieves the location of the prior calendar appointment. The process sets the user location to the retrieved location of prior calendar appointment at step 938, with the process terminating thereafter.

Further, in some embodiments, the process may also determine the user location based on the day of the week that the calendar appointment is on. For example, a user may specify the user location as a work location for workday appointments and a home location for weekend appointments. Thus, in these embodiments, the process determines the day of the week associated with the calendar appointment at step 946. The process then retrieves the user specified location for the particular day of the week at step 950. The process sets the user location to the retrieved user specified location for the calendar appointment at step 954, with the process terminating thereafter. In addition, in some embodiments, if a user location is not determinable, the process may also set the user location to a default location at step 958, with the process terminating thereafter.

Accordingly, the disclosed embodiments present a system and method for providing travel-related information associated with a calendar appointment. The method comprises monitoring a calendar application for travel-related appointments. In response to identifying a travel-related appointment, the method retrieves travel-related information associated with the location and provides the travel-related information to a user.

Further, the disclosed embodiments monitor for changes to the provided travel-related information and notify the user of any changes in condition. Moreover, the disclosed embodiments provide smart reminders to a user of a calendar appointment by accounting for the time necessary to travel to a location associated with a calendar appointment.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments described above with reference to flowchart illustrations and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method for providing travel-related information associated with calendar appointments being maintained by a computing system, the method comprising:
   placing appointment information associated with the calendar appointments into an appointment queue being operated by the computing system;
   monitoring, by the computing system, a calendar application being executed on the computing system for travel-related appointments, the calendar application retrieving the appointment information from the appointment queue;
   responsive to identifying a travel-related appointment from the appointment information, retrieving, by the computing system, travel time information associated with a location of the travel-related appointment including a time to reach a location associated with the travel-related appointment;
   providing, by the computing system, the travel-related information to a user, wherein the travel-related information includes at least a flight number, a departing airport, and a flight schedule in response to the travel-related appointment being associated with a flight;
   automatically updating the travel-related appointment and the travel time information in response to the computing system determining there are changes to the travel-related information and the travel time information; and
   communicating the travel-related information and the travel time information to the user in response to determining there is an update.

2. The method of claim 1, wherein retrieving the travel time information and the travel-related information and providing the travel time information and the travel-related information to the user are performed at a specified time prior to the travel-related appointment.

3. The method of claim 2, wherein the specified time is specified by the user, and wherein the travel time information indicates an estimated travel time from a user location to the location associated with the travel-related appointment.

4. The method of claim 1, wherein retrieving the travel time distance information associated with the location of the travel-related appointment includes retrieving directions from a user location to the location associated with the travel-related appointment.

5. The method of claim 4, further comprising determining the user location based on a prior calendar appointment location.

6. The method of claim 1, wherein retrieving the travel time information associated with the location of the travel-related appointment includes retrieving weather information associated with the location of the travel-related appointment.

7. The method of claim 1, wherein retrieving travel time information associated with the location of the travel-related appointment includes retrieving traffic-related information associated with traveling to the location of the travel-related appointment.

8. The method of claim 1, wherein retrieving travel time information associated with the location of the travel-related appointment includes retrieving points of interest associated with the location of the travel-related appointment.

9. The method of claim 3, further comprising automatically updating the specified time to compensate for travel time to the location of the travel-related appointment in response to a distance between the location associated with the travel-related appointment and the user changing.

10. The method of claim 1, further comprising notifying the user with an alert of any changes associated with the travel time information and the travel-related information including at least a flight schedule and a distance to the location associated with the travel-related appointment.

11. The method of claim 1, further comprising requesting missing information associated with the travel-related appointment from a user of the calendar application.

12. A method for providing appointment notifications, by a computing system, the method comprising:
    placing appointment information associated with the calendar appointments into an appointment queue being operated by the computing system;
    monitoring, by the computing system, a calendar application for travel-related appointments of a user, the calendar application retrieving the appointment information from the queue,
    determining, by the computing system, an appointment location and an appointment time associated with a travel-related appointment;
    determining, by the computing system, a user location of the user;
    determining, by the computing system, an estimated travel time for traveling from the user location to the appointment location;
    calculating, by the computing system, a remaining time until the appointment time;
    determining, by the computing system, an available time by subtracting the estimated travel time from the remaining time;
    notifying a user, by the computing system, of travel time information associated with the travel-related appointment including at least the appointment location, the appointment time, estimated travel time, a remaining time, and directions from the user location to the appointment location;
    automatically updating travel-related appointment including includes at least a flight number, a departing airport, and a flight schedule in response to the computing system determining there are changes to the travel-related information and the travel-related information being associated with a flight; and
    notifying, by the computing system, the user (1) if the available time is less than or equal to a specified time limit, and (2) that the travel time information or the travel-related information has been updated.

13. The method of claim 12, wherein determining the user location includes applying a specified user location.

14. The method of claim 12, wherein determining the user location further includes:
 determining a day associated with the travel-related appointment; and
 responsive to the day being a workday, identifying a work location of the user as the user location.

15. The method of claim 12, wherein determining the user location further includes:
 determining a day associated with the travel-related appointment; and
 responsive to the day being a non-workday, identifying a home location of the user as the user location.

16. The method of claim 12, wherein determining the user location includes determining a current location of the user by receiving geographical coordinates of a wireless communication device associated with the user.

17. The method of claim 12, wherein determining the estimated travel time for traveling from the user location to the appointment location includes accounting for a current traffic condition associated with traveling from the user location to the appointment location.

18. The method of claim 12, further comprising:
 determining an airport location in response to the travel-related appointment requiring air travel;
 determining an estimated travel time for traveling from the user location to the airport location;
 calculating a remaining time until a flight time;
 determining an available time by subtracting the estimated travel time from the remaining time; and
 notifying the user if the available time is less than or equal to a specified time limit.

19. An apparatus for providing travel-related information associated with calendar appointments, the apparatus comprising:
 a data bus system;
 memory coupled to the data bus system, wherein the memory includes computer usable program code;
 a processing unit coupled to the data bus system, wherein the processing unit executes the computer usable program code to:
  place appointment information associated with the calendar appointments into an appointment queue being operated by the computing system;
  monitor a calendar application for travel-related appointments, the calendar application retrieving the appointment information from the queue;
  retrieve travel time information associated with a location of a travel-related appointment including a time to reach a location associated with the travel-related appointment;
  automatically update the travel time information and the travel-related appointment in response to the computing system determining there are changes to the travel time information and the travel-related information; and
  provide the travel time information and the travel-related information to a user, wherein the travel-related information includes at least a flight number, a departing airport, and a flight schedule in response to the travel-related appointment being associated with a flight.

20. The apparatus of claim 19, wherein the processing unit further executes the computer usable program code to notify the user of any of the updates associated with the travel time information and the travel-related information.

* * * * *